United States Patent
Burka et al.

(10) Patent No.: US 8,769,230 B2
(45) Date of Patent: Jul. 1, 2014

(54) PARALLEL, SINGLE-PASS COMPACTION IN A REGION-BASED GARBAGE COLLECTOR

(75) Inventors: Peter Wiebe Burka, Ottawa (CA); Jeffrey Michael Disher, Ottawa (CA); Daryl James Maier, Unionville (CA); Aleksandar Micic, Ottawa (CA); Ryan Andrew Sciampacone, Nepean (CA)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 13/431,971

(22) Filed: Mar. 28, 2012

(65) Prior Publication Data

US 2012/0203994 A1 Aug. 9, 2012

Related U.S. Application Data

(63) Continuation of application No. 13/023,437, filed on Feb. 8, 2011.

(51) Int. Cl.
*G06F 12/00* (2006.01)

(52) U.S. Cl.
USPC .... 711/165; 711/170; 711/173; 711/E12.002; 707/813; 707/817

(58) Field of Classification Search
USPC .......... 711/165, 170, 173, E12.002; 707/813, 707/817
See application file for complete search history.

(56) References Cited

U.S. PATENT DOCUMENTS 7,340,494 B1 3/2008 Detlefs et al.
7,584,232 B2 9/2009 Guo

OTHER PUBLICATIONS

Liu, et al. "Space-and-Time Efficient Parallel Garbage Collector for Data-Intensive Applications." International Journal of Parallel Programming, DOI: 10.1007/s10766-010-0151-4, Oct. 2010.
Abuaiadh, et al., "An Efficient Parallel Heap Compaction Algorithm", Proceedings of the 19th Annual ACM SIGPLAN Conference on Object-Oriented Programming, Systems, Languages, and Applications, 2004.
Kermany, et al., "The Compressor: Concurrent, Incremental, and Parallel Compaction", PLDI'06, pp. 354-363, 2006.

*Primary Examiner* — Jasmine Song
(74) *Attorney, Agent, or Firm* — Nelson and Nelson; Daniel P. Nelson; Alexis V. Nelson (57) ABSTRACT

A method to implement parallel, single-pass compaction in a garbage collector is described. In one embodiment, such a method includes conducting a planning phase for multiple regions to be compacted. During the planning phase, the method determines new locations for data entities in the multiple regions. The method then performs a move phase for the multiple regions to move the data entities to their new locations. During the move phase, the method initiates multiple compaction threads to move the data entities to their new locations. While executing, the compaction threads dynamically build a dependency graph of the regions being compacted. The dependency graph guarantees that no data entity is moved to its new location until all data entities that it overwrites have been moved to their new locations. A corresponding computer program product and apparatus are also disclosed herein.

20 Claims, 10 Drawing Sheets

PARALLEL, SINGLE-PASS COMPACTION IN A REGION-BASED GARBAGE COLLECTOR

BACKGROUND

1. Field of the Invention

This invention relates to memory management, and more specifically to apparatus and methods for compacting regions in memory.

2. Background of the Invention

Any memory management system that does not move objects may be affected by memory fragmentation. One important mechanism for resolving fragmentation is compaction. In an article entitled "An Efficient Parallel Heap Compaction Algorithm," published in 2004, the authors (Abuaiadh et al.) disclosed, at the time, a state of the art compactor that is currently used in many Java Virtual Machines. The compactor (hereinafter the "Aduaiadh compactor") parallelizes very well, but requires two passes over the heap, both of which write to the heap. The first pass moves objects and the second pass fixes up references between objects, based on their new locations.

More recently, in an article entitled "The Compressor: Concurrent, Incremental, and Parallel Compaction," published in 2006, the authors (Kermany et al.) described a novel compactor which improves on the Abuaiadh compactor. The compactor (hereinafter the "Kermany compactor") is a "stop-the-world" compactor that divides compaction into two phases, referred to herein as the "planning" phase and "move" phase. During the planning phase, the new location of each object or group of objects is determined and recorded in a concise manner in an offset table. Planning is based only on the mark vector—it does not require a pass to read or write to the heap. Once planning is complete, the data in the mark vector and offset table may be combined to determine the destination of any object. This allows the move phase to move objects to their predetermined destinations and fix up their references to other objects at the same time. The move phase is the only phase of the compactor which reads or writes to the heap—planning and external fix-up do not need to read or write to heap memory. The Kermany compactor also includes a concurrent and incremental aspect, which are not discussed here.

Although the Kermany compactor parallelizes the move phase, the parallelization of movement relies on the use of memory mapping, using the operating system's virtual memory subsystem, to ensure that a compactor thread never copies over objects which haven't been copied yet. To accomplish this, the Kermany compactor allocates a second block of memory addresses which map onto the same physical memory as the object heap. As the Kermany compactor compacts the heap, it allocates new "to-virtual-space" pages in which to move objects. As "from-virtual-space" pages are completely evacuated, they are unmapped. Using this technique, the Kermany compactor does not need to worry about moving an object into a page which has not yet been fully evacuated.

However, the Kermany compactor's heavy use of virtual memory for mapping and unmapping is expensive. It typically requires system calls and can be prohibitively slow. It also requires additional address space. The authors acknowledge that this requirement "may create some problem for large heaps on a 32-bit machine." Also, the Kermany compactor relies on the use of relatively small pages so that virtual memory can be managed at a fine granularity. Hardware and software systems are increasingly moving towards larger page sizes. On large 64-bit systems, for example, 16 GB pages are now available. Such large pages make this mapping/unmapping strategy impractical.

In view of the foregoing, what are needed are apparatus and methods to parallelize object movement in a single pass over an object heap. Ideally, such apparatus and methods will provide mechanisms to ensure that live objects are not overwritten by other live objects, without requiring use of virtual memory.

SUMMARY

The invention has been developed in response to the present state of the art and, in particular, in response to the problems and needs in the art that have not yet been fully solved by currently available apparatus and methods. Accordingly, the invention has been developed to provide apparatus and methods to implement parallel, single-pass compaction in a region-based garbage collector. The features and advantages of the invention will become more fully apparent from the following description and appended claims, or may be learned by practice of the invention as set forth hereinafter.

Consistent with the foregoing, a method to implement parallel, single-pass compaction in a garbage collector is disclosed herein. In one embodiment, such a method includes conducting a planning phase for multiple regions to be compacted. During the planning phase, the method determines new locations for data entities in the multiple regions. The method then performs a move phase for the multiple regions to move the data entities to their new locations. During the move phase, the method initiates multiple compaction threads to move the data entities to their new locations. While executing, the compaction threads dynamically build a dependency graph of the regions being compacted. The dependency graph guarantees that no data entity is moved to its new location until all data entities that it overwrites have been moved to their new locations.

A corresponding computer program product and apparatus are also disclosed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, microcode, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to various embodiments of the invention. It will be understood that each block of the flowchart illustrations and/or block diagrams, and combinations of blocks in the flowchart illustrations and/or block diagrams, may be implemented by computer program instructions or code. The computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
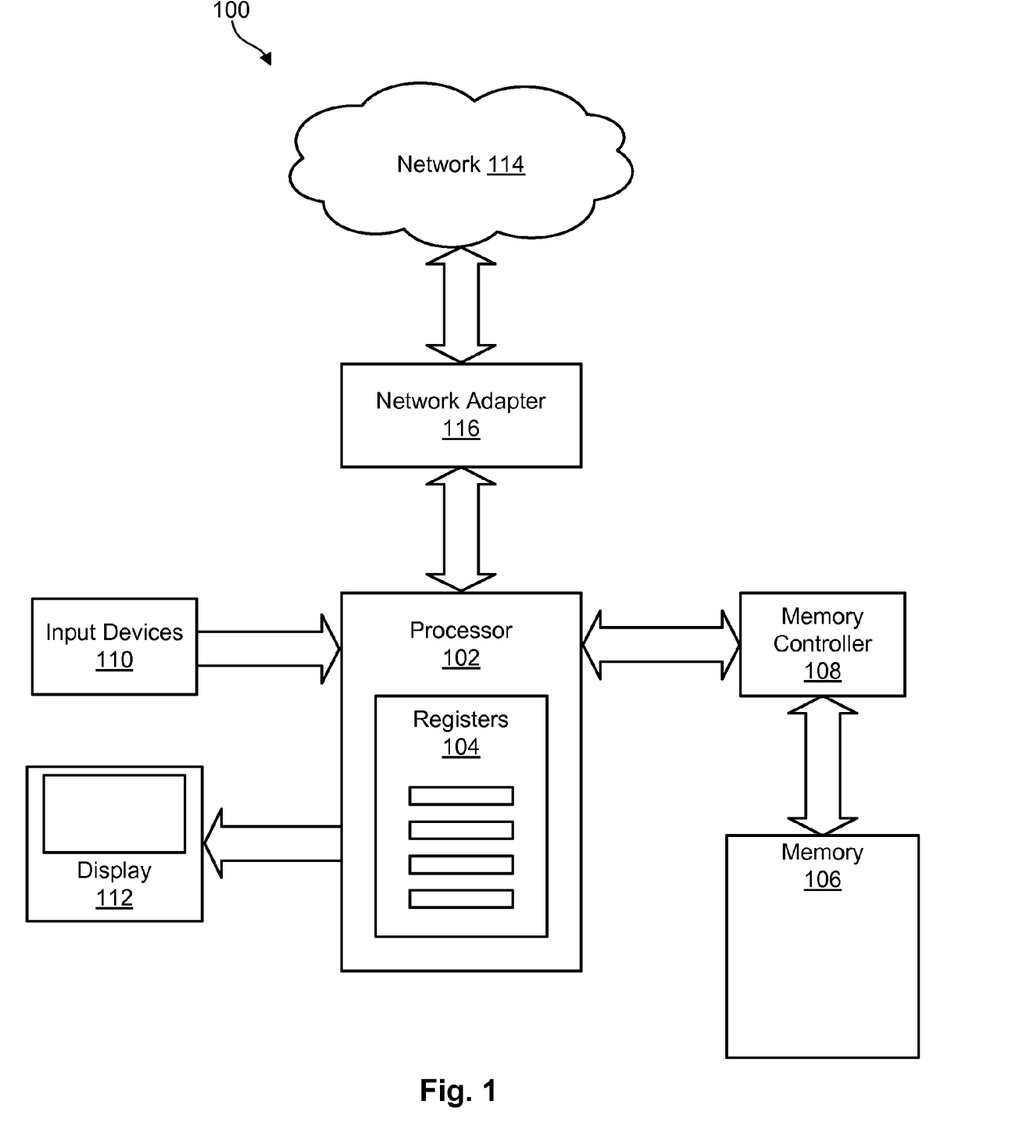
FIG. 1 is a high-level block diagram showing one example of a computer system suitable for use with various embodiments of the invention.

Referring to FIG. 1, one example of a computer system 100 is illustrated. The computer system 100 is presented to show one example of an environment where an apparatus and method in accordance with the invention may be implemented. The computer system 100 is presented only by way of example and is not intended to be limiting. Indeed, the apparatus and methods disclosed herein may be applicable to a wide variety of different computer systems in addition to the computer system 100 shown. The apparatus and methods disclosed herein may also potentially be distributed across multiple computer systems 100.

The computer system 100 includes at least one processor 102 and may include more than one processor. The processor 102 includes one or more registers 104 storing data describing the state of the processor 102 and facilitating execution of software systems. The registers 104 may be internal to the processor 102 or may be stored in a memory 106. The memory 106 stores operational and executable data that is operated upon by the processor 102. The memory 106 may be accessed by the processor 102 by means of a memory controller 108. The memory 106 may include volatile memory (e.g., RAM) as well as non-volatile memory (e.g., ROM, EPROM, EEPROM, hard disks, flash memory, etc.).

The processor 102 may be coupled to additional devices supporting execution of software and interaction with users. For example, the processor 102 may be coupled to one or more input devices 110, such as a mouse, keyboard, touch screen, microphone, or the like. The processor 102 may also be coupled to one or more output devices such as a display device 112, speaker, or the like. The processor 102 may communicate with one or more other computer systems by means of a network 114, such as a LAN, WAN, or the Internet. Communication over the network 114 may be facilitated by a network adapter 116.

Figure 2:
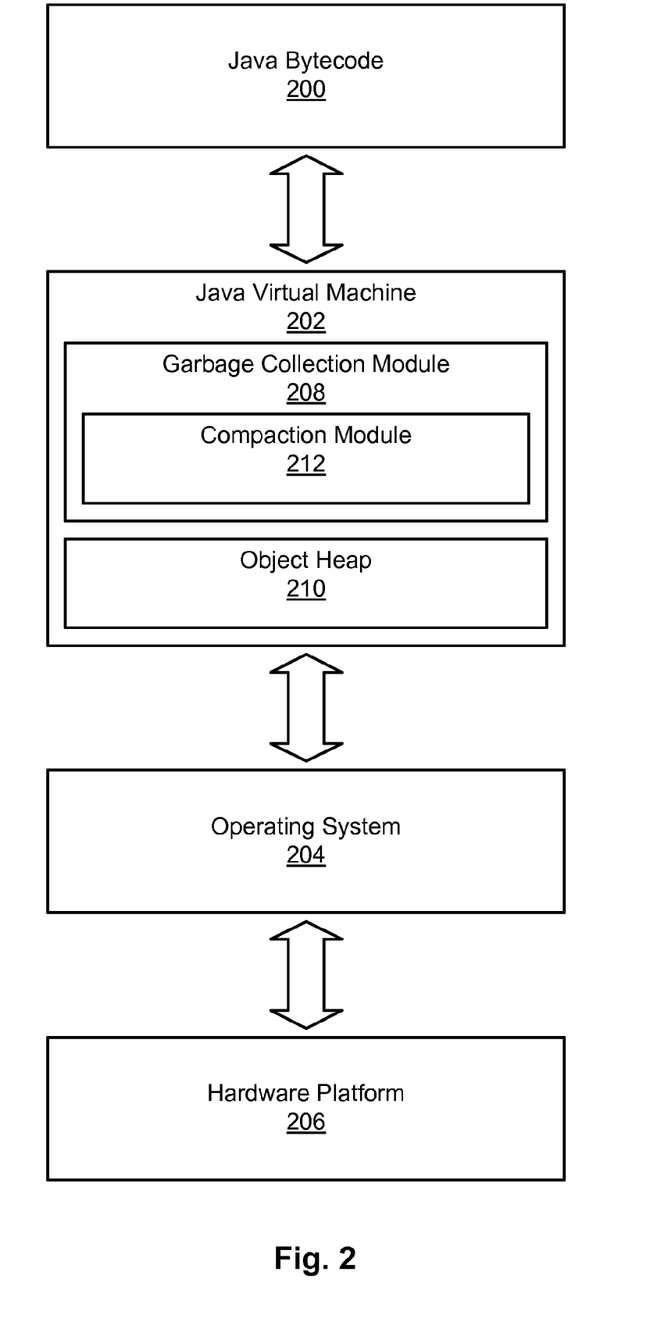
FIG. 2 is a high-level block diagram showing one example of an object-oriented managed runtime, in this example the Java Virtual Machine, incorporating a compaction module in accordance with the invention.

Referring to FIG. 2, one example of an object-oriented managed runtime, in this example the Java Runtime Environment, is illustrated. The Java Runtime Environment is presented to show one example of a runtime environment in which various embodiments of the invention may operate. Nevertheless, the compaction techniques disclosed herein are not limited to the Java Runtime Environment but may operate or be adapted to operate in any object-oriented managed runtime that uses an object heap to store objects. Other nonlimiting examples of runtime environments in which embodiments of the invention might operate include the Microsoft Common Language Runtime (CLR) and Smalltalk runtime. Thus, although particular reference is made herein to the Java Runtime Environment, the principles taught herein are not limited to the Java Runtime Environment but may also be applicable to other runtime environments.

As shown in FIG. 2, in the Java Runtime Environment, a Java Virtual Machine 202 may be configured to operate on a specific platform, which may include an underlying hardware and operating system architecture 204, 206. As shown, the Java Virtual Machine 202 receives program code 200, compiled to an intermediate form referred to as "bytecode" 200. The Java Virtual Machine 202 translates this bytecode 200 into native operating system calls and machine instructions for execution on the underlying platform 204, 206. Instead of compiling the bytecode 200 for the specific hardware and software platform 204, 206, the bytecode 200 is compiled once to operate on all Java Virtual Machines 202. A Java Virtual Machine 202, by contrast, may be tailored to the underlying hardware and software platform 204, 206. In this way, the Java bytecode 200 may be considered platform independent.

In the Java Runtime Environment, the primary memory resource is a garbage-collected object heap 210. The object heap 210 provides memory for objects, each of which is an instance of a class. A garbage collection module 208, or subsystem 208, is provided in the Java Runtime Environment to reclaim memory occupied by objects, or classes associated with objects, that are no longer in use by a program. Among other benefits, the garbage collection module 208 frees a programmer from worrying about releasing objects that are no longer needed, which would otherwise require significant design effort from the programmer.

In order to reduce pause times, the garbage collection module 208 may, in certain embodiments, be configured to operate in an incremental manner. That is, the garbage collection module 208 may be configured to perform garbage collection processes on a portion of the object heap 210 at a time, as opposed to the entire object heap 210. In order to accomplish this, the object heap 210 may be divided into a number of regions (e.g., hundreds or even thousands of regions). The garbage collection module 208 may then perform garbage collection on a subset of these regions at any particular time. This incremental garbage collection process minimizes, as much as possible, disruption of the main program.

As memory is reclaimed from objects that are no longer reachable, holes or gaps may be left in various regions of the object heap 210. If the remaining live objects are not moved, the holes or gaps may lead to memory fragmentation. This may impair program performance as allocating objects within these gaps or holes is typically more costly than allocating objects in large contiguous spaces. To reduce this problem, compaction algorithms may be used to group live objects together and create large contiguous spaces for allocating new objects. Thus, in certain embodiments, the garbage collection module 208 includes a compaction module 212 to perform compaction algorithms on the object heap 210.

Figure 3A:
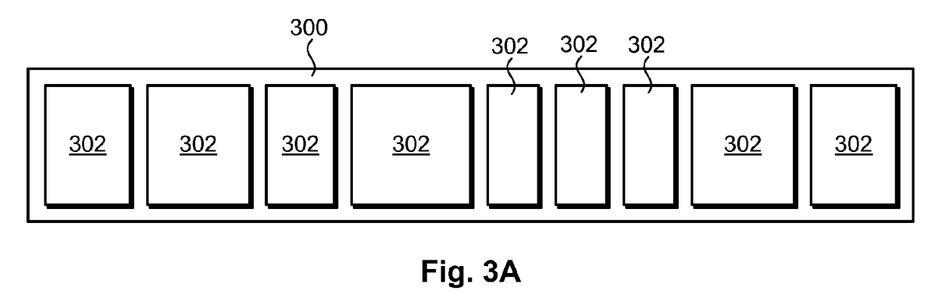
FIGS. 3A through 3D show a general compaction process on a region.
Figure 3B:
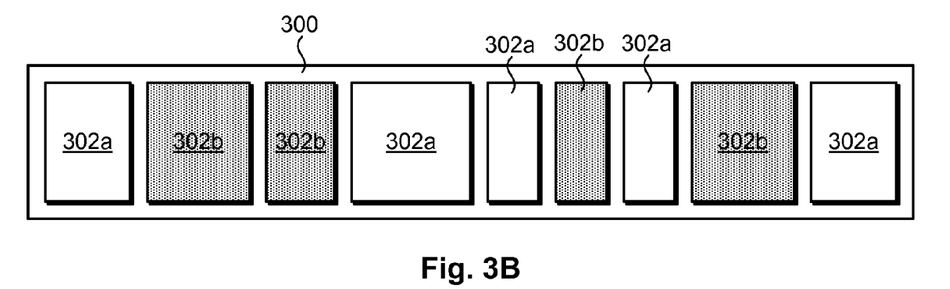
Figure 3C:
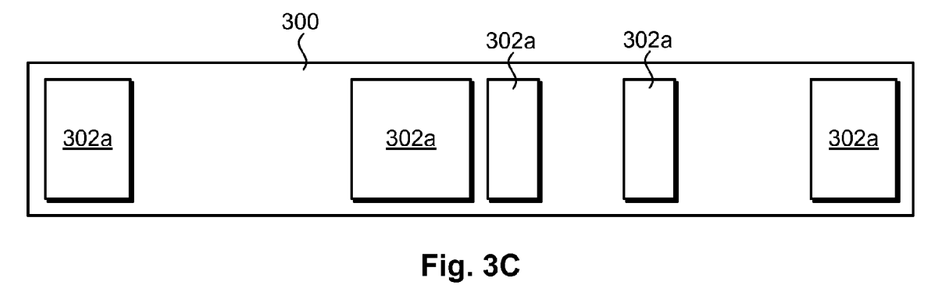
Figure 3D:
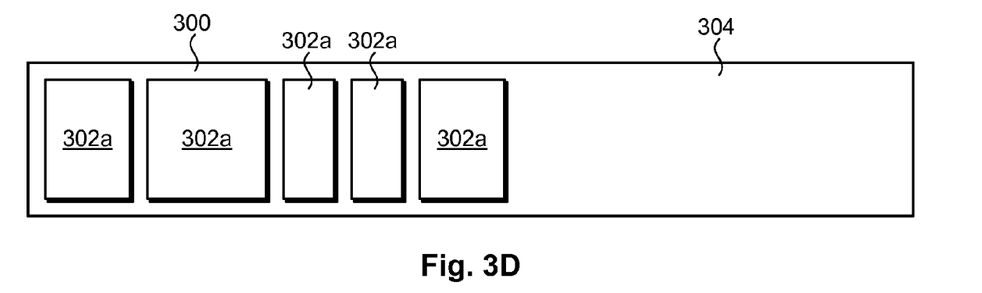

FIGS. 3A through 3D provide an example of a general compaction process on a region 300 of an object heap 210. As shown in FIG. 3A, a region 300 may initially contain one or more objects 302. During a garbage collection process, the garbage collection module 208 may traverse a program graph, starting with root objects, to discover all live objects 302a (objects referenced by other live objects) in the region 300. As shown in FIG. 3B, the garbage collection module 208 marks each live object 302a that it encounters during the traversal, indicating that the object 302a is in use. All remaining objects 302b are considered dead (unreachable). The garbage collection module 208 then frees the memory occupied by the dead objects 302b, effectively clearing the dead objects 302b from memory, as shown in FIG. 3C. The compaction module 212 may then compact the remaining live objects 302a by moving the objects toward the low address of the region 300 to create a large contiguous space 304, as shown in FIG. 3D. New objects may then be allocated within the large contiguous space 304.

During the compaction process, certain objects 302a may be moved within regions 300, while other objects 302a may be moved from one region 300 to another. When moving objects 302a, care must be taken to ensure that live objects 302a are not overwritten by other live objects 302a. To accomplish this, the compaction module 212 builds a dependency graph of the regions 300 being compacted to ensure that no live object 302a is moved to its new location until all live objects 302a that it overwrites have been moved to their new locations. Rather than explicitly generating this dependency graph, which would require single-threaded execution time and either extra storage or extra time to discover dependencies, the compaction module 212 may be configured to discover dependencies and generate the dependency graph dynamically as objects 302a are moved to their new locations. The manner in which dependencies are discovered and used to build a dependency graph will be discussed in more detail hereafter.

Figure 4:
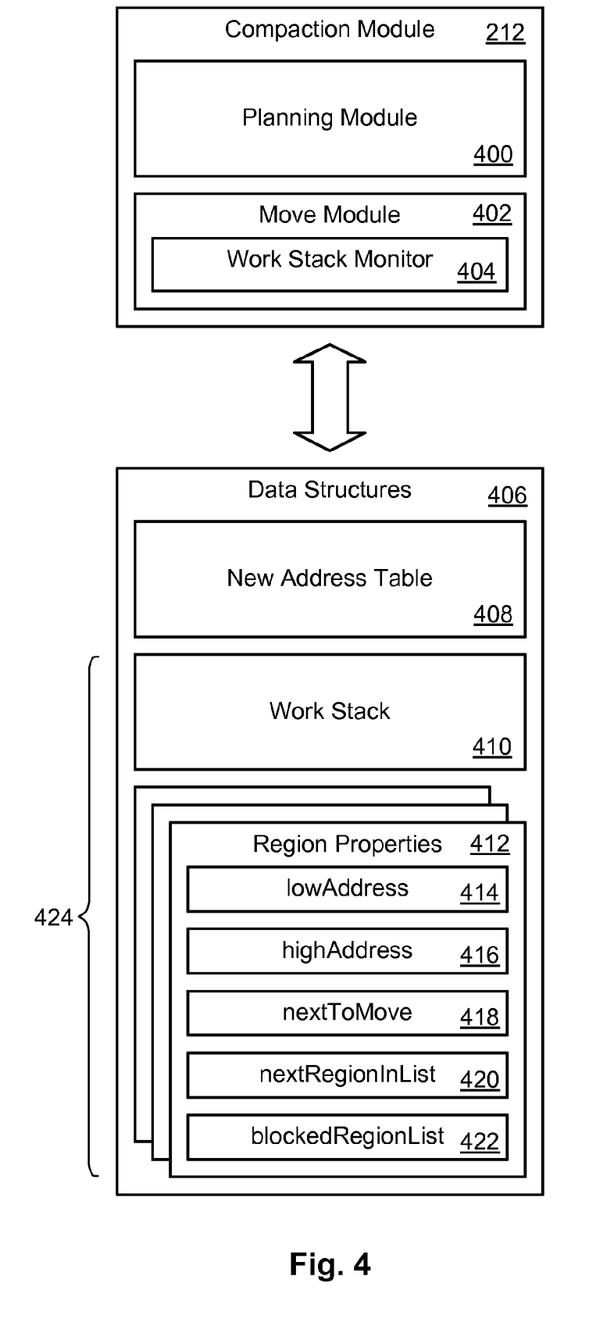
FIG. 4 shows one example of a compaction module and various related data structures used to create a dependency graph.

Referring to FIG. 4, in certain embodiments, the compaction module 212 includes a planning module 400 and a move module 402. The planning module 400 may conduct the planning phase of the compaction process, wherein new locations of live objects are determined. For example, the planning module 400 may conduct the planning phase in the manner described in the Abuaiadh or Kermany articles previously described. The move module 402 may conduct the move phase of the compaction process, wherein live objects are moved to their new locations. To implement the move phase, the move module 402 may initiate multiple compaction threads, each of which may operate in parallel, to compact the regions 300.

During the compaction process, the planning module 400 and move module 402 may interact with various data structures 406. For example, upon determining the new addresses of live objects, the planning module 400 may store these addresses in a new address table 408. The compaction threads initiated by the move module 402 may look up new addresses in the address table 408 in order to move live objects to their new locations. While moving live objects to their new locations, the compaction threads may interact with a work stack 410, and region properties 412 associated with each region 300. In the illustrated embodiment, the work stack 410 and region properties 412 together create the dependency graph 424 discussed herein.

The work stack 410 contains a list of regions 300 to be compacted. When looking for work to perform, the compaction threads pop regions from the work stack 410. A work stack monitor 404 controls access to the work stack 410, ensuring that only one compaction thread can access the work stack 410 at any particular time. A compaction thread will wait on the work stack monitor 404 if there is no work available. When a compaction thread adds new work to the work stack 410, or it is the last thread running and finds there is no work on the work stack 410, the compaction thread will notify all compaction threads that are waiting on the work stack monitor 404. This will allow the waiting threads to either pop work from the work stack 410 or, if no work is available, exit the work stack monitor 404 and return from the work stack 410 (since this means that the compaction process is complete).

In certain embodiments, the work stack 410 includes a pointer to a list of regions 300 it contains, a count of waiting threads, and an "isDone" flag. One thread may initially populate the work stack 410 with all the regions 300 that are participating in the compaction process. Depending on the implementation of the planning phase, the work stack 410 may be built as a side-effect of the planning algorithm in order to eliminate the need for this additional serialization. In either case, the operation is low-cost since it blindly pushes all regions 300 onto the work stack 410, without attempting to infer dependency therebetween. Once a compaction thread finishes processing a region 300, it either discards the region (if processing is complete) or adds the region to another region's blockedRegionList 422. A region 300 will be pushed back onto the work stack 410 after being removed from a now-completed region's blockedRegionList 422. Since objects from a region 300 may be moved to several different regions 300, it is possible that a region 300 will end up moving through the work stack 410 and a blockedRegionList 422 multiple times during a single compaction cycle.

A region 300 is a logical unit of compaction work and may include the illustrated properties 412. The lowAddress property 414 is the base address of the region 300. This property 414 is constant during compaction. The highAddress property 416 is the address of the first byte after the region 300, which is also constant during compaction. The nextToMove property 418 is the address of the next object to be moved from the region 300. This property 418 starts at the lowAddress 414 and becomes equal to the highAddress 416 when all of the region's objects have been moved. The nextRegionInList property 420 points to the next region 300 in the same list as a region 300 (the list may include either the work stack 410 or another region's blockedRegionList). The blockedRegionList property 422 points to a list of regions 300 which are blocked on a region 300 and cannot be processed until compaction of the region 300 is complete.

The compaction of a region 300 generally progresses from lowAddress 414 to highAddress 416 and continually updates the next nextToMove pointer 418 to point at the next object to be moved. Initially, the nextToMove pointer 418 points at the lowAddress 414 and eventually progresses to highAddress 416 when the compaction of the region 300 is completed. A region 300 becomes dynamically dependent on a target region 300 when the destination address of nextToMove plus nextToMove's instance size is greater than the nextToMove pointer of the target region containing the destination address. When this situation occurs, the region's compaction is suspended and the region 300 is added to the blockedRegionList 422 of the target region 300.

Figure 5:
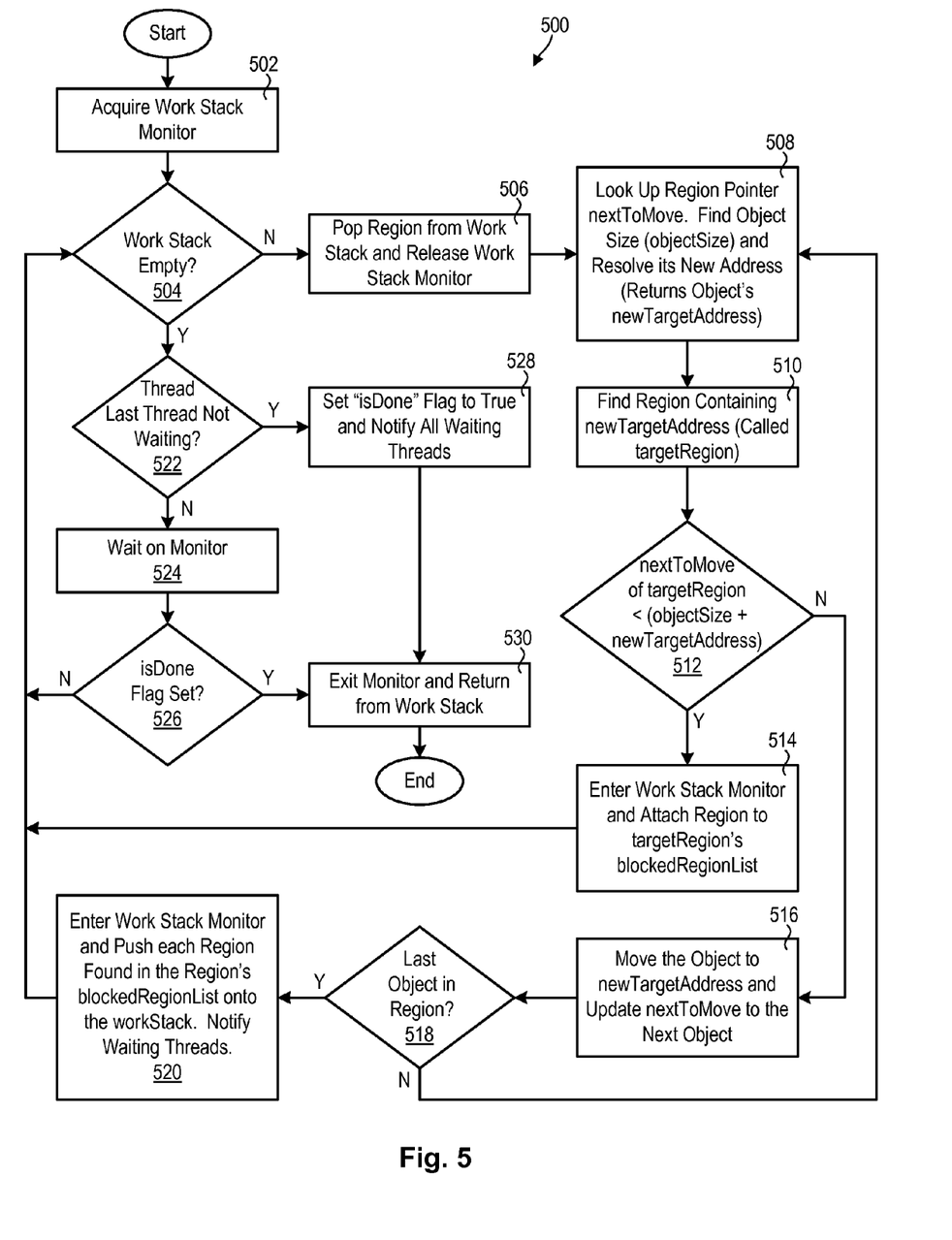
FIG. 5 shows one embodiment of a method for implementing parallel, single-pass compaction on regions of an object heap.

Referring to FIG. 5, one embodiment of a method 500 for implementing parallel, single-pass compaction in a garbage collector is illustrated. Such a method 500 may be executed in parallel by each of the compaction threads after the planning phase has been completed. When the method 500 begins, no region 300 is known to be blocked on any other region 300, each region 300 has its nextToMove pointer 418 set to the first object it contains, and all regions 300 to be compacted are contained in the monitor-protected work stack 410.

As illustrated, a compaction thread initially acquires 502 the work stack monitor 404, which provides access to the work stack 410. The compaction thread then determines 504 whether the work stack 410 is empty. If the work stack 410 is not empty, the compaction thread pops 506 a region from the work stack 410 and releases 506 the work stack monitor 404.

The compaction thread then looks up 508 the region's nextToMove pointer 418 to find the next object to be moved from the region 300. Upon finding this object, the method determines 508 the object size (objectSize) and resolves 508 the new address of the object (this returns the newTargetAddress). The compaction thread then finds 510 the region (targetRegion) containing the newTargetAddress. Upon finding 510 the targetRegion, the compaction thread determines 512 whether the nextToMove pointer of the targetRegion is less than the objectSize added to the newTargetAddress. This step 512 essentially determines 512 whether moving the object will overwrite data that has yet to be processed in the targetRegion.

If moving the object will overwrite unprocessed data in the targetRegion, the object cannot be moved since it may overwrite live objects. In such a case, the compaction thread enters 514 the work stack monitor 404 and attaches 514 the current region to the targetRegion's blockedRegionList. If the object will not overwrite unprocessed data in the targetRegion, the compaction thread moves 516 the object to the newTargetAddress in the targetRegion and updates 516 the nextToMove pointer of the current region 300 to the next object in the region 300. The compaction thread then determines 518 whether the object that was moved was the last object in the region 300. If not, the compaction thread repeats steps 508, 510, 512, 514, 516 for the next object in the region 300.

If, at step 518, the compaction thread determines that an object is the last object in a region 300, the compaction thread enters 520 the work stack monitor 404 and pushes 520 each region found in the region's blockedRegionList onto the work stack 410. This step 520 essentially unblocks 520 any regions that are blocked on the current region 300, since processing of the current region 300 is complete. Once regions in the blockedRegionList are pushed onto the work stack 410, the compaction thread notifies 520 any waiting compaction threads to wake up the threads and make them aware that new work is on the work stack 410.

At this point, the compaction thread determines 504 whether the work stack 410 is empty. If the work stack 410 is not empty, the compaction thread pops 506 the next region from the work stack 410 and processes the region in the manner previously described. If the work stack 410 is empty, the compaction thread determines 522 whether it is the last compaction thread not waiting on the work stack monitor 404. If it is the last compaction thread not waiting, the compaction thread sets 528 the "isDone" flag to true (indicating that the compaction process has been completed for all participating regions 300) and notifies 528 all waiting compaction threads. The compaction thread then exits 530 the work stack monitor 404 and returns 530 from the work stack 410. Any waiting compaction threads that are notified 528 will wake up and see that the isDone flag is set, allowing them to exit the work stack monitor 404 and return from the work stack 410.

If, at step 522, a compaction thread is not the last thread not waiting on the work stack monitor 404, the compaction thread simply waits 524 on the work stack monitor 404. When the compaction thread wakes up, the compaction thread determines 526 whether the isDone flag is set. If the isDone flag is not set, the compaction thread looks 504 for work on the work stack 410 in the manner previously described. If the isDone flag is set, however, the compaction thread exits 530 the work stack monitor 404 and returns 530 from the work stack 410.

Figure 6:
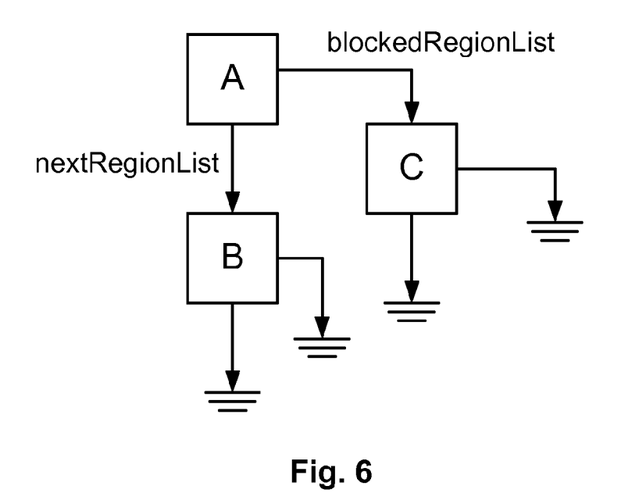
FIG. 6 shows various conventions for use in association with FIGS. 7 through 16.

Referring to FIG. 6, various conventions are shown for use in association with FIGS. 7 through 16. The boxes shown in FIG. 6 represent regions 300. For example, FIG. 6 shows boxes representing Regions A, B, and C. The arrows originating from the bottom of a box represent the nextRegionInList. For example, Region B is the next region in the same list as Region A. Arrows originating from the right of a region represent a blockedRegionList. For example, Region C is blocked until the processing of region A is complete.

Referring generally to FIGS. 7 through 16, a simple example of the compaction process described hereinabove is illustrated. This very simple example assumes a pair of compaction threads (Thread 1 and Thread 2), a work stack (Work Stack), and four regions (Regions A, B, C, and D). In reality, a system might have hundreds or even thousands of regions. Thus, this example is intended to describe the core elements of the novel compaction process on a simpler scale.

Figure 7:
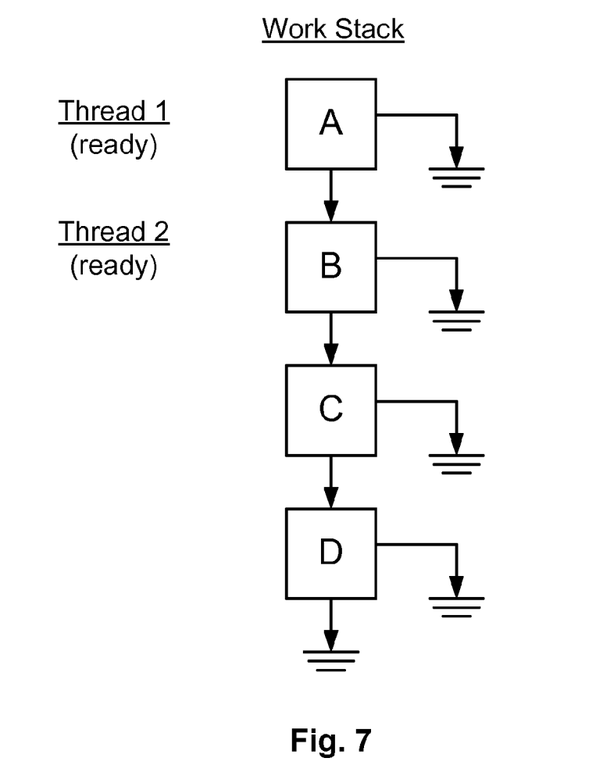
FIGS. 7 through 16 show a simple specific example of operation of the compaction module using a pair of compaction threads (Thread 1 and Thread 2), a work stack (Work Stack), and four regions (Regions A, B, C, and D).
Figure 8:
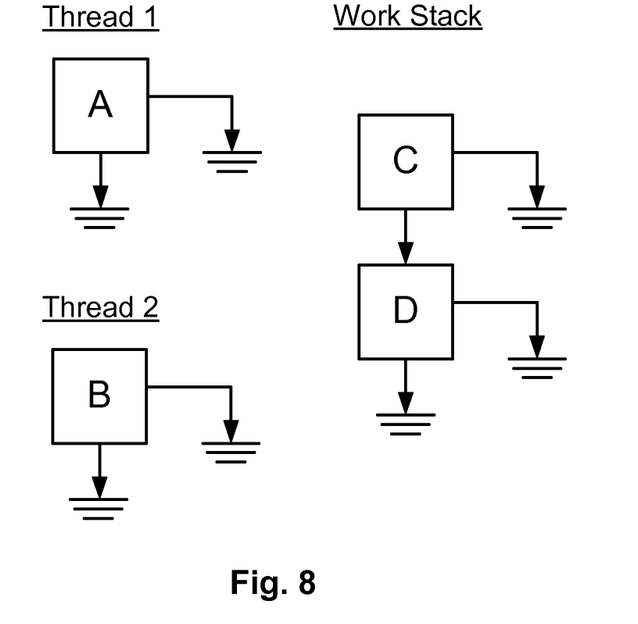

FIG. 7 shows the state of the system prior to beginning the compaction process. As shown in FIG. 7, prior to beginning the compaction process, Regions A, B, C, and D are in the work stack 410, with no regions blocked on any other regions. Both threads are idle but ready to perform work. As shown in FIG. 8, both threads pop a region from the work stack 410 and begin compacting the regions. Thus Thread 1 begins to process Region A and Thread 2 begins to process Region B.

Figure 9:
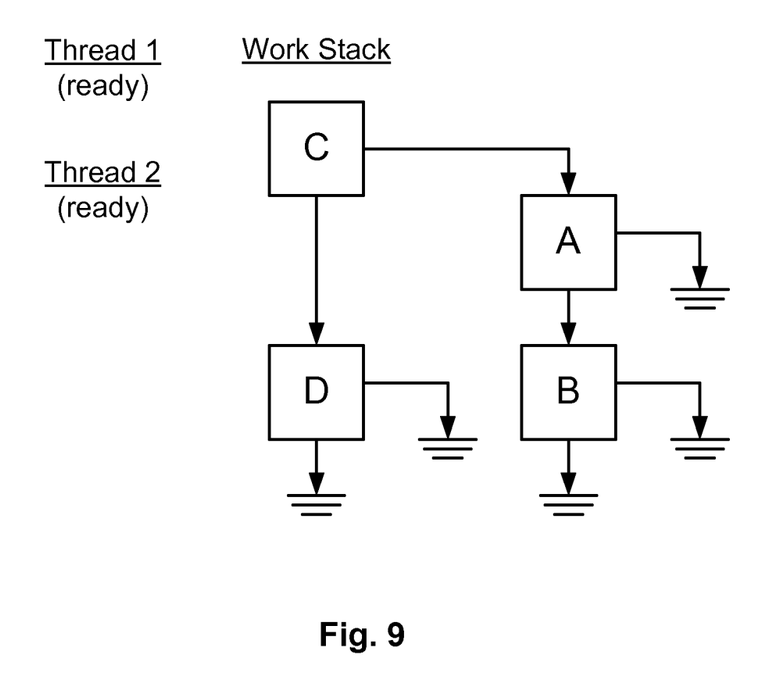
Figure 10:
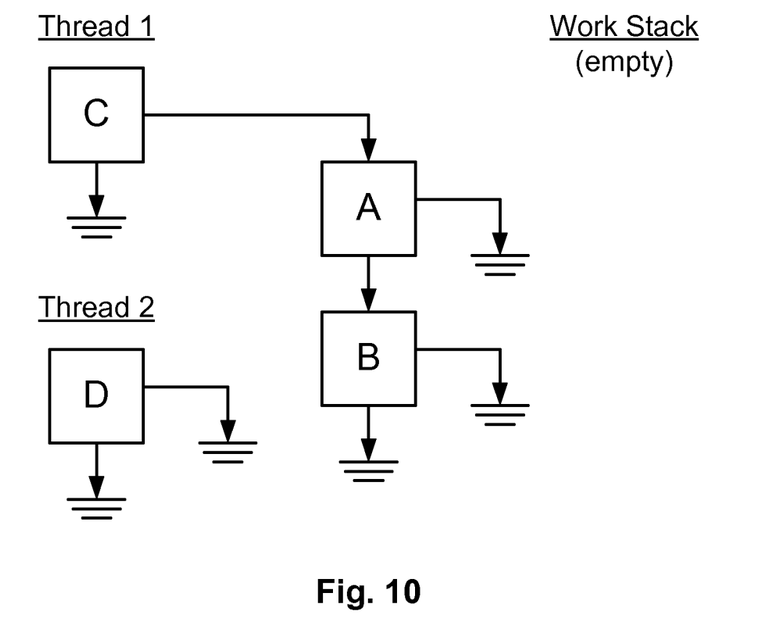

Assume that Thread 1 discovers that Region A depends on Region C being completed and Thread 2 discovers that Region B also depends on Region C being completed. As a result, both Regions are added to Region C's blockedRegionList, as shown in FIG. 9. Both Threads then pop the remaining regions (Regions C and D) from the work stack 410, thereby leaving the work stack 410 empty, as shown in FIG. 10.

Figure 11:
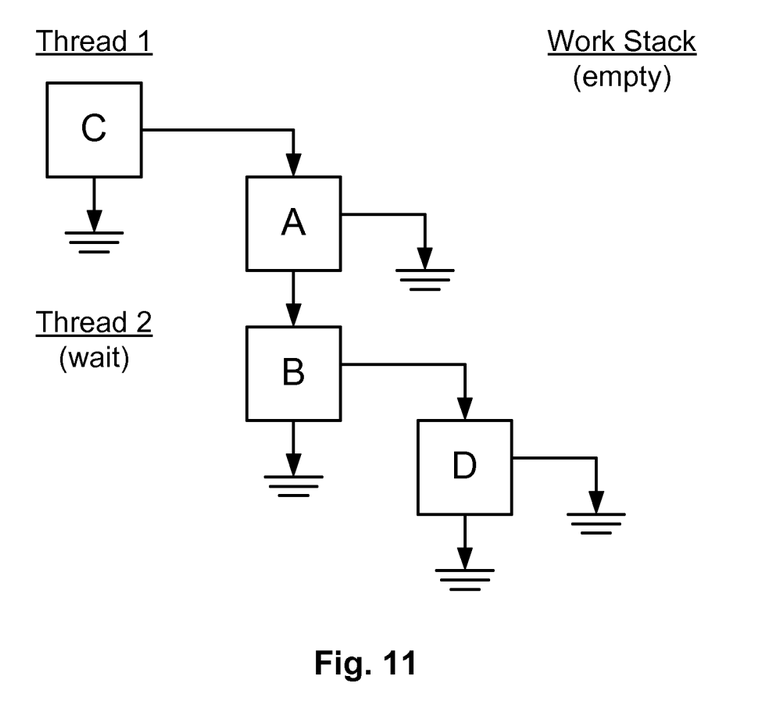

Assume that Thread 2 discovers that Region D depends on Region B being completed. As a result, Region D is added to Region B's blockedRegionList. This creates a multi-level dependency where Region D is indirectly blocked on Region C. Upon adding Region D to Region B's blockedRegionList, Thread 2 finds the work stack 410 empty and thus waits on the work stack monitor 404, as shown in FIG. 11.

Figure 12:
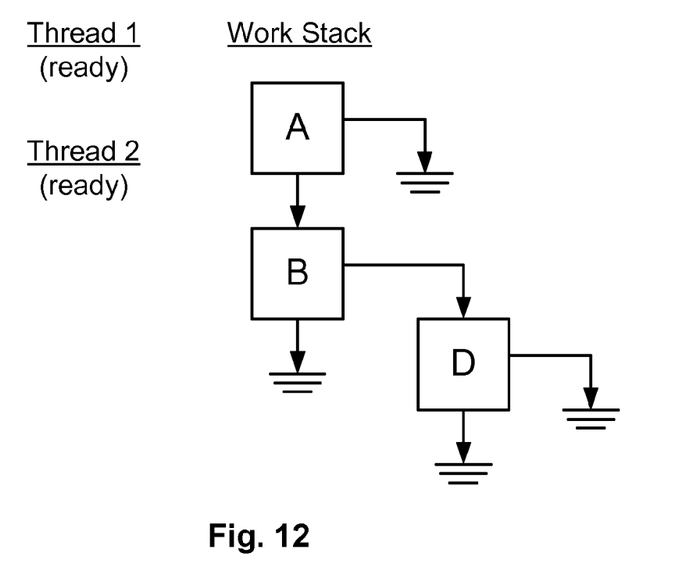
Figure 13:
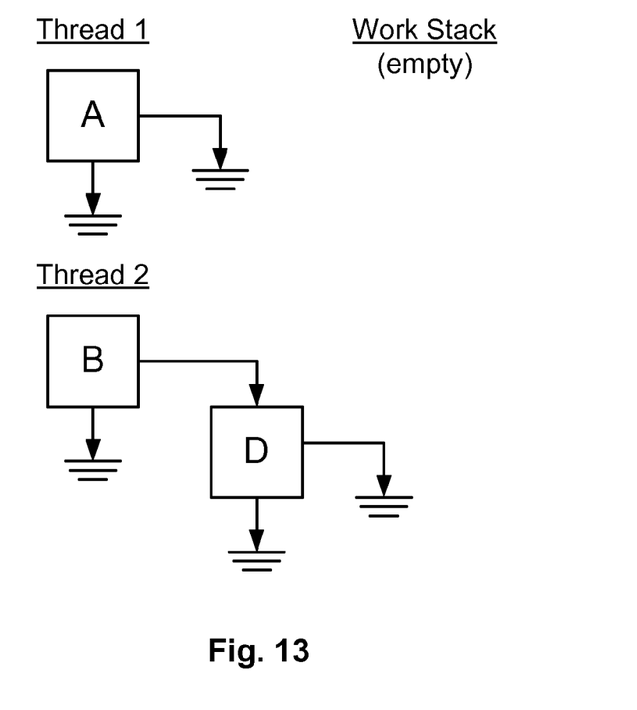
Figure 14:
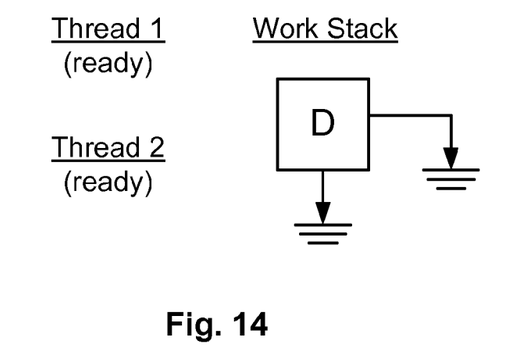
Figure 15:
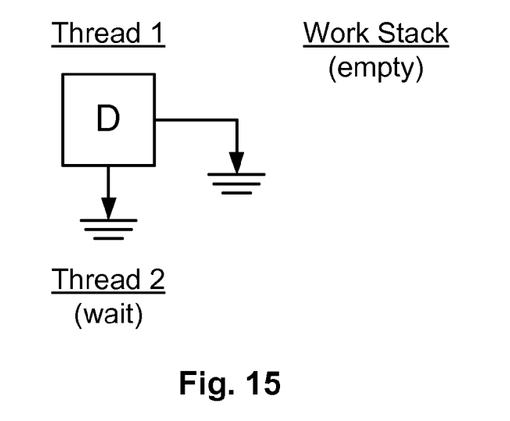
Figure 16:
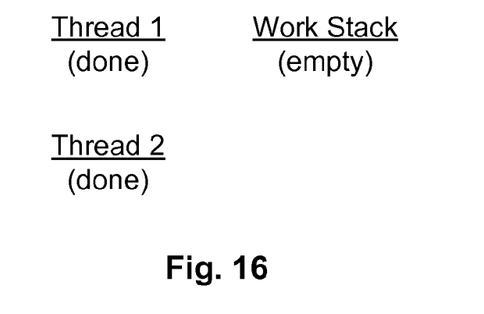

When Thread 1 finishes processing Region C, and discards it from the system, it pushes both of its blocked regions (Regions A and B) onto the work stack 410, as shown in FIG. 12. Threads 1 and 2 then pop these Regions from the work stack 410 and begin compacting them, as shown in FIG. 13. Thread 1 finishes processing Region A and discards it from the system. Likewise, Thread 2 finishes processing Region B and discards it from the system. Upon completing Region B, Thread 2 pushes its blocked region (Region D) onto the work stack 410, as shown in FIG. 14. Thread 1 then pops Region D from the work stack 410 and finishes processing it. Thread 2 waits for more work to appear in the work stack 410. Once Thread 1 processes Region D and discards it from the system, Thread 1 will realize that it is the last thread still running (not waiting). In response, Thread 1 sets the isDone flag, notifies Thread 2, and exits the compaction process. Thread 2 wakes up, checks the isDone flag to realize it is set, and exits the compaction process.

Although the above-described compaction process has focused primarily on moving individual objects, the compaction process could also be applied to data entities having different granularities. For example, the compaction process could be applied to small groups of contiguous objects, thereby reducing the need to explicitly track the new address of every object individually. In such an embodiment, the compaction process could consider the size of the group, instead of a single object, to determine if it will fit at its new location. The nextToMove pointer would also require less frequent updates as it would point to the base of an object group instead of an individual object.

In other embodiments, the above-described compaction process could be modified such that regions in a blockedRegionList don't require compaction to be completed on the target region before being pushed back onto the work stack 410. Because regions may depend on particular parts of the target region being processed, rather than the entire target region being processed, these regions could be pushed back onto the work stack 410 as the target region's compaction progresses, rather than after the compaction of the target region has entirely completed. In certain embodiments, the blockedRegionList could be sorted by blocking address to make checking the list efficient.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in a block may occur out of the order noted in the Figures. For example, two blocks shown in succession may, in fact, be executed substantially concurrently, or the blocks may sometimes be executed in the reverse order, depending upon the functionality involved. Some blocks may be deleted or other blocks may be added depending on the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for implementing parallel, single-pass compaction in a garbage collector, the method comprising:
    conducting a planning phase for a plurality of regions to be compacted, wherein conducting the planning phase comprises determining new locations for data entities in the plurality of regions; and
    performing a move phase for the plurality of regions to move the data entities to their new locations, wherein performing the move phase comprises:
        initiating a plurality of compaction threads to move the data entities to their new locations; and
        dynamically building a dependency graph of the regions being compacted as the compaction threads move the data entities to their new locations, wherein the dependency graph comprises a work stack listing which regions need to be compacted and, for each region of the plurality regions, a blocked regions list listing which regions are blocked on the corresponding region and cannot be processed until compaction of the corresponding region is complete.

2. The method of claim 1, wherein the plurality of compaction threads are configured to operate in parallel.

3. The method of claim 1, wherein the data entities are at least one of objects and groups of objects.

4. The method of claim 1, wherein performing the move phase comprises performing the move phase in a single pass over the plurality of regions.

5. The method of claim 1, wherein the compaction threads are configured to pop regions from the work stack to determine which regions need to be compacted.

6. The method of claim 5, wherein, upon completing a region, a compaction thread pushes all regions in the region's blocked regions list onto the work stack.

7. The method of claim 5, wherein, upon encountering a first data entity that cannot be moved because a second data entity that it overwrites has not yet been moved, placing the region associated with the first data entity in the blocked regions list of the region associated with the second data entity.

8. A computer program product to implement parallel, single-pass compaction in a garbage collector, the computer program product comprising a non-transitory computer-readable storage medium having computer-usable program code embodied therein, the computer-usable program code comprising:

> computer-usable program code to conduct a planning phase for a plurality of regions to be compacted, wherein conducting the planning phase comprises determining new locations for data entities in the plurality of regions;
>
> computer-usable program code to perform a move phase for the plurality of regions to move the data entities to their new locations, wherein performing the move phase comprises:
>
>> initiating a plurality of compaction threads to move the data entities to their new locations; and
>>
>> dynamically building a dependency graph of the regions being compacted as the compaction threads move the data entities to their new locations, the dependency graph comprising a work stack listing which regions need to be compacted and, for each region of the plurality regions, a blocked regions list listing which regions are blocked on the corresponding region and cannot be processed until compaction of the corresponding region is complete.

9. The computer program product of claim 8, wherein the plurality of compaction threads are configured to operate in parallel.

10. The computer program product of claim 8, wherein the data entities are at least one of objects and groups of objects.

11. The computer program product of claim 8, wherein performing the move phase comprises performing the move phase in a single pass over the plurality of regions.

12. The computer program product of claim 8, wherein the compaction threads are configured to pop regions from the work stack to determine which regions need to be compacted.

13. The computer program product of claim 12, further comprising computer-usable program code to, upon completing a region, push all regions in the region's blocked regions list onto the work stack.

14. The computer program product of claim 12, further comprising computer-usable program code to, upon encountering a first data entity that cannot be moved because a second data entity that it overwrites has not yet been moved, place the region associated with the first data entity in the blocked regions list of the region associated with the second data entity.

15. An apparatus to implement parallel, single-pass compaction in a garbage collector, the apparatus comprising:

> a planning module to conduct a planning phase for a plurality of regions to be compacted, wherein conducting the planning phase comprises determining new locations for data entities in the plurality of regions; and
>
> a move module to perform a move phase for the plurality of regions to move the data entities to their new locations, wherein performing the move phase comprises:
>
>> initiating a plurality of compaction threads to move the data entities to their new locations; and
>>
>> dynamically building a dependency graph of the regions being compacted as the compaction threads move the data entities to their new locations, the dependency graph comprising a work stack listing which regions need to be compacted and, for each region of the plurality regions, a blocked regions list listing which regions are blocked on the corresponding region and cannot be processed until compaction of the corresponding region is complete.

16. The apparatus of claim 15, wherein the plurality of compaction threads are configured to operate in parallel.

17. The apparatus of claim 15, wherein the data entities are at least one of objects and groups of objects.

18. The apparatus of claim 15, wherein performing the move phase comprises performing the move phase in a single pass over the plurality of regions.

19. The apparatus of claim 15, wherein the compaction threads are configured to pop regions from the work stack to determine which regions need to be compacted.

20. The apparatus of claim 19, wherein the move module is further configured to, upon completing a region, push all regions in the region's blocked regions list onto the work stack.

* * * * *